(12) United States Patent
Swett

(10) Patent No.: US 8,392,819 B2
(45) Date of Patent: Mar. 5, 2013

(54) COLUMN SELECTION, INSERTION AND RESIZING IN COMPUTER-GENERATED TABLES

(75) Inventor: Daniel Albert Swett, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 459 days.

(21) Appl. No.: 12/469,375

(22) Filed: May 20, 2009

(65) Prior Publication Data

US 2010/0299587 A1 Nov. 25, 2010

(51) Int. Cl.
*G06F 17/25* (2006.01)
*G06F 17/26* (2006.01)

(52) U.S. Cl. .................................. 715/227; 715/800
(58) Field of Classification Search .................. 715/227, 715/800
See application file for complete search history.

(56) References Cited

U.S. PATENT DOCUMENTS

| | | | | |
|---|---|---|---|---|
| 5,239,287 A * | 8/1993 | Siio et al. | .......................... | 345/163 |
| 5,467,448 A * | 11/1995 | Hilton et al. | ................... | 715/235 |
| 5,631,131 A * | 5/1997 | Jolivet et al. | ................... | 435/6.15 |
| 5,768,606 A | 6/1998 | Sharp | | |
| 6,057,837 A * | 5/2000 | Hatakeda et al. | .............. | 715/765 |
| 6,725,422 B1 | 4/2004 | Bauchot et al. | | |
| 6,988,241 B1 | 1/2006 | Guttman et al. | | |
| 7,146,562 B2 | 12/2006 | Janssen | | |
| 7,779,346 B2 * | 8/2010 | Buczek | .......................... | 715/227 |
| 2005/0268248 A1 | 12/2005 | Boerner et al. | | |
| 2006/0136807 A1 * | 6/2006 | Yalovsky et al. | .............. | 715/503 |
| 2008/0028290 A1 * | 1/2008 | Suwiryo | ........................ | 715/227 |
| 2009/0217206 A1 * | 8/2009 | Liu et al. | ........................ | 715/846 |
| 2010/0077344 A1 * | 3/2010 | Gaffney et al. | ............... | 715/788 |

OTHER PUBLICATIONS

Camarda, Bill, "Special Edition Using Microsoft Word 2000", Que, 1999, pp. 1-34.*
Appleby, G., "Dynamic Table Column Resizing in HTML," http://blogs.crankygoblin.com/blogs/geoff.appleby/archive/2004/10/30/30481.aspx, pp. 1-7 (Oct. 30, 2004).
Creating Good Looking Websites, http://www.synthasite.com/tutorials/creating_good_looking_websites, pp. 1-7 (Copyright 2009).
FrameMaker 7.0 Tutorial: Tables, http://www.io.com/~tcm/etwr2472/guides/frame/frame_tables.html, pp. 1-14 (Publicly known at least as early as Mar. 20, 2009).
ScrollTable, http://code.google.com/p/google-web-toolkit-incubator/wiki/ScrollTable, pp. 1-12 (Feb. 12, 2009).
Wilson, D., "Tk::Columns—A Multicolumn List Widget with Sortable & Sizeable Columns," http://search.cpan.org/~dkwilson/Tk-DKW-0.03/Tk/Columns.pm, pp. 1-8 (Copyright 1999).

* cited by examiner

*Primary Examiner* — Doug Hutton, Jr.
*Assistant Examiner* — James Debrow
(74) *Attorney, Agent, or Firm* — Merchant & Gould

(57) ABSTRACT

A method for selecting a row or column within a computer-generated table at a client computing device includes: receiving an indication of a cursor being located within a specified perimeter zone associated with a row or column within a table; in response to receiving an indication of a cursor being located within a specified perimeter zone associated with a row or column within a table, displaying an on-object user interface; receiving an indication of a selection of the displayed on-object user interface; and in response to receiving an indication of a selection of the displayed on-object user interface, designating the row or column within the table associated with the displayed on-object user interface for allowing modification to content contained within the designated row or column.

17 Claims, 7 Drawing Sheets

300

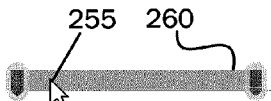

| Beach | Hello | Description |
|---|---|---|
| Event Site | | Great site for overall sailing but gets crowded. |
| Hatchery | | Awesome waves, strong wind; world class. |
| Doug's Beach | | Great swell riding location but strong current. |
| Rowena | | Very choppy but usually warmest water. |

325

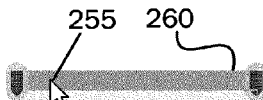

| Beach | Hello | Description |
|---|---|---|
| Event Site | | Great site for overall sailing but gets crowded. |
| Hatchery | | Awesome waves, strong wind; world class. |
| Doug's Beach | | Great swell riding location but strong current. |
| Rowena | | Very choppy but usually warmest water. |

| Beach | Description |
|---|---|
| Event Site | Great site for overall sailing but gets crowded. |
| Hatchery | Awesome waves, strong wind; world class. |
| Doug's Beach | Great swell riding location but strong current. |
| Rowena | Very choppy but usually warmest water. |

425

| Beach | | Description |
|---|---|---|
| Event Site | | Great site for overall sailing but gets crowded. |
| Hatchery | | Awesome waves, strong wind; world class. |
| Doug's Beach | | Great swell riding location but strong current. |
| Rowena | | Very choppy but usually warmest water. |

450

| Beach | Hello | Description |
|---|---|---|
| Event Site | | Great site for overall sailing but gets crowded. |
| Hatchery | | Awesome waves, strong wind; world class. |
| Doug's Beach | | Great swell riding location but strong current. |
| Rowena | | Very choppy but usually warmest water. |

475

| | | |
|---|---|---|
| Beach | Hello | Description |
| Event Site | | Great site for overall sailing but gets crowded. |
| Hatchery | | Awesome waves, strong wind; world class. |
| Doug's Beach | | Great swell riding location but strong current. |
| Rowena | | Very choppy but usually warmest water. |

FIG 4

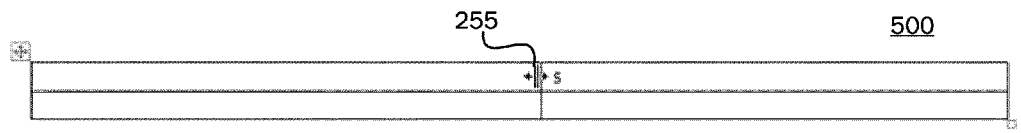
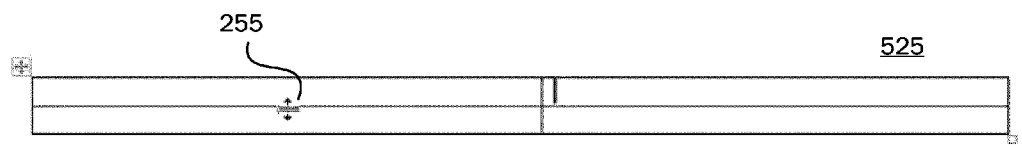
FIG 5

COLUMN SELECTION, INSERTION AND RESIZING IN COMPUTER-GENERATED TABLES

BACKGROUND

Online browser-based platforms are becoming increasingly utilized as a means to provide an on-demand, always-on, highly elastic software and application service to a user with a computing device with a browser and an Internet connection. Clients may utilize such platforms for a variety of applications from data processing to video games. When utilizing a web-based application for document creation and editing, current methods for manipulating a table in a document on the web are inefficient and difficult. For example, utilizing current methods to insert a table utilizing a web-based application, a user would need to specify the number of rows and columns he/she wants in his/her table. To resize those rows or columns, the user would need to go into a dialogue and type in new values. It is with respect to these and other considerations that the present invention has been made.

SUMMARY

Embodiments of the present invention are directed to systems and methods for easy and intuitive table manipulation in a web-based application. To provide a user with a more fluid process by which to manipulate a table structure within his/her document, the present invention provides the ability for the user to select, insert, and resize rows and columns of a table intuitively and easily by incorporating the use of on-object user interfaces.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 3 shows example tables illustrating activation and selection of a column selection mechanism for selecting a column of a table in a web-based application.

FIG. 4 shows examples tables illustrating insertion of a column and row of a table in a web-based application utilizing on-object user interfaces.

FIG. 5 shows example tables illustrating resizing a column and row of a table in a web-based application.

DETAILED DESCRIPTION

As briefly described above, embodiments of the present invention are directed to systems and methods for easy and intuitive table manipulation in a web-based application. To provide a user with a more fluid process by which to manipulate a table structure within his/her document, the present invention provides the ability for the user to select, insert, and resize rows and columns of the table intuitively and easily incorporating the use of on-object user interfaces.

Figure 1:
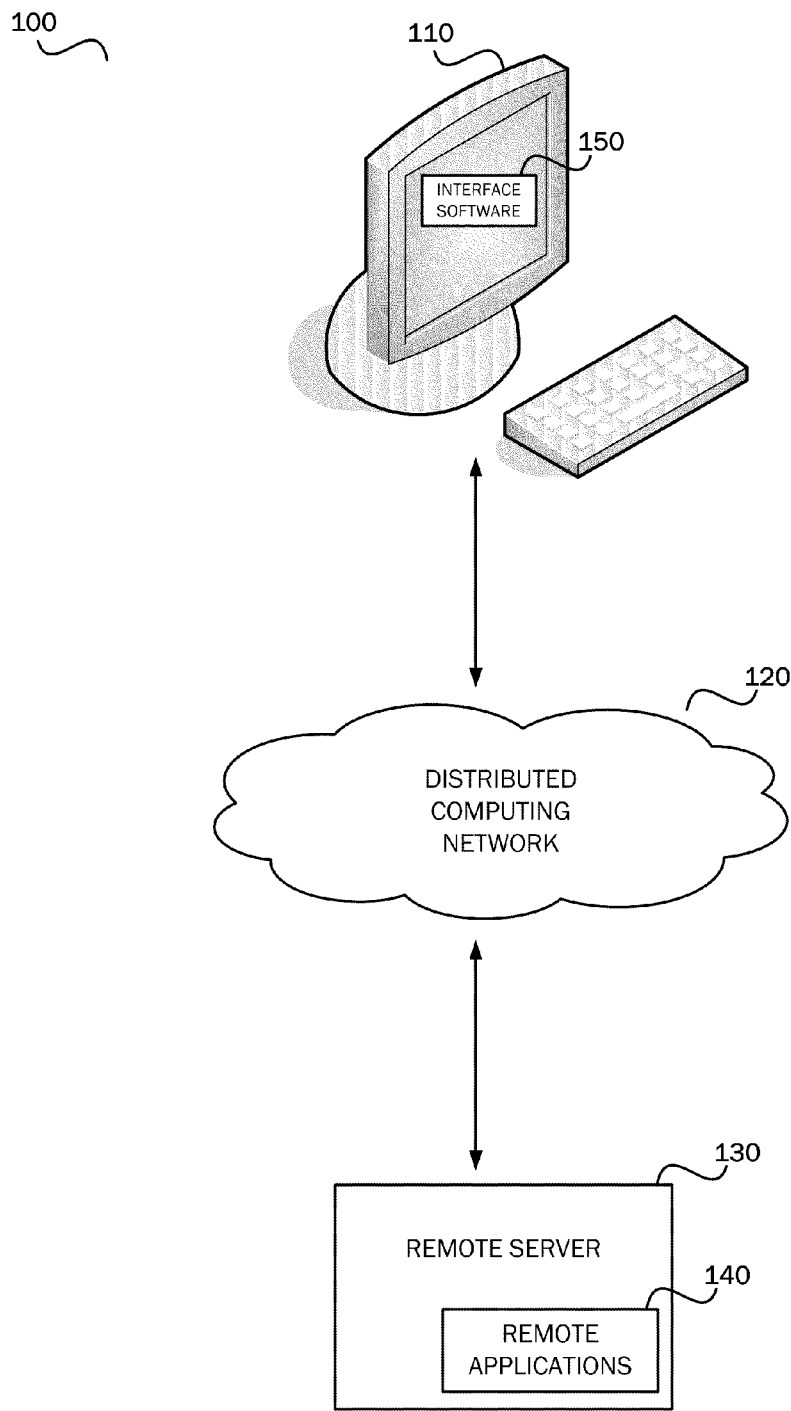
FIG. 1 shows a simplified block diagram of a computing architecture for utilizing a web-based application.

Embodiments of the present invention may be used on a computing device as illustrated and described below. FIG. 1 shows an example system 100 of one embodiment of a computing architecture for accessing and utilizing web-based applications. This technology is sometimes referred to as cloud computing. The example system 100 may include a client computing device 110, a distributed computing network 120, and a remote server 130. Greater or fewer clients, networks, and servers may be used.

In example embodiments, client computing device 110 may be a desktop computer, laptop computer, terminal computer, personal data assistant, cellular telephone device, or any other computing device known in the art. Computing device 110 may include input/output devices, a central processing unit ("CPU"), a data storage device, and a network device. In one embodiment, computing device 110 may include a web browser 150. In the present disclosure, the terms client and client computing device are used interchangeably.

Remote server 130 is a computing device that may include a database server and a front-end server that is accessible to client 110 through distributed computing network 120. Remote server 130 may include input/output devices, a central processing unit ("CPU"), a data storage device, and a network device. In example embodiments, distributed computing network 120 is the Internet and client 110 may remotely access remote server 130, which may contain remote applications 140 and other resources on and connected to it.

In one embodiment, a document may be rendered on example remote server 130 by client 110. Client 110 may include a web browser application 150, for example INTERNET EXPLORER from MICROSOFT CORPORATION of Redmond, Wash. The web browser application 150 may be used in conjunction with various online browser-based applications 140. One example of an online browser-based application 140 may be a collaboration and document management application 140 that may be utilized to create, gather, organize, find, and share a user's notes and information in a digital notebook.

As should be appreciated by those skilled in the art, according to another embodiment, the present invention may also operate within an application on a client computing device 110. For example, the invention may also be used to create or manipulate a table within in a document utilizing a word processing application like MICROSOFT WORD from MICROSOFT CORPORATION of Redmond, Wash. located locally on a user's computing device 110.

Figure 2:
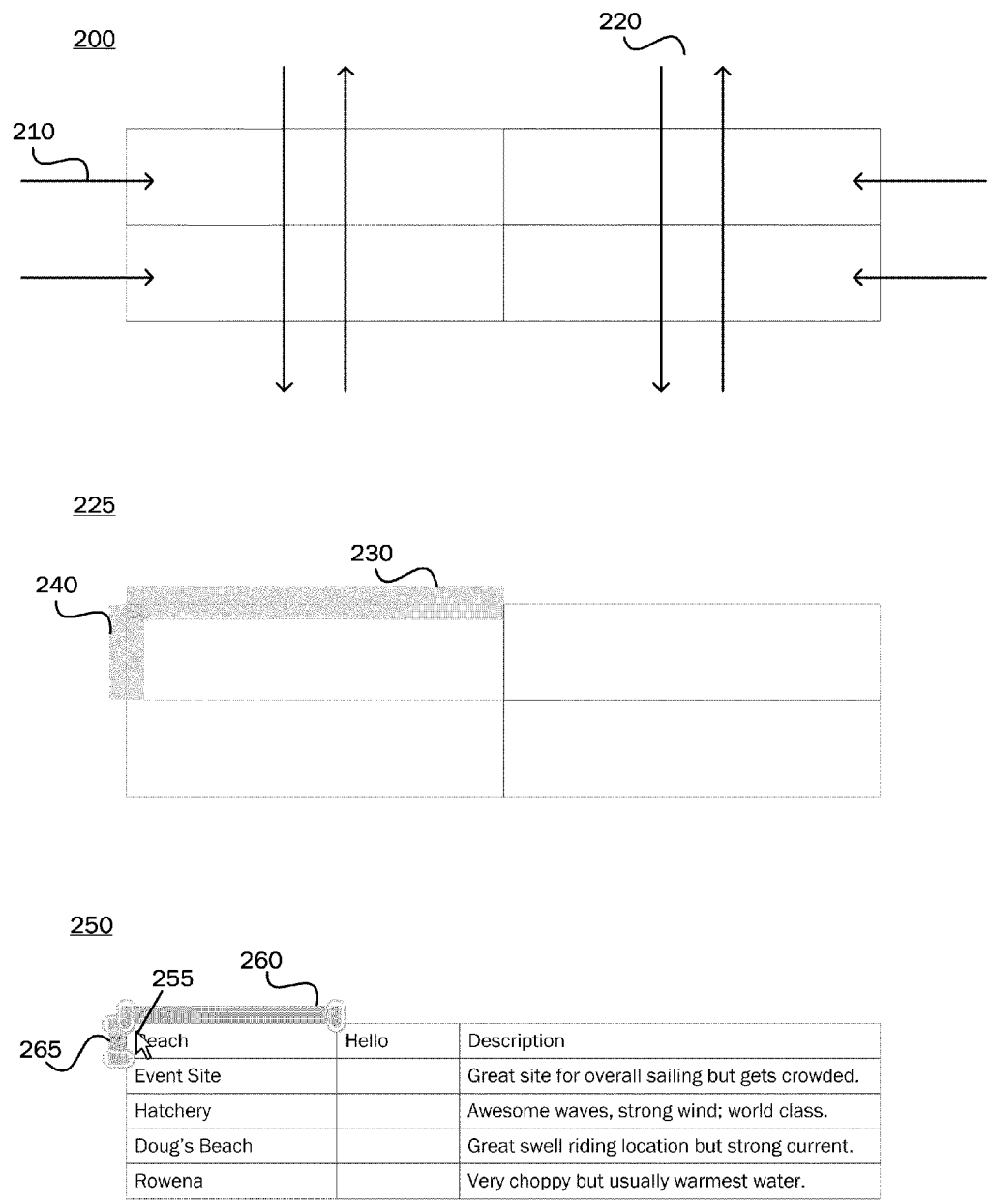
FIG. 2 shows example tables illustrating an on-object user interface for selecting a row or column of a table in a web-based application.
Figure 6:
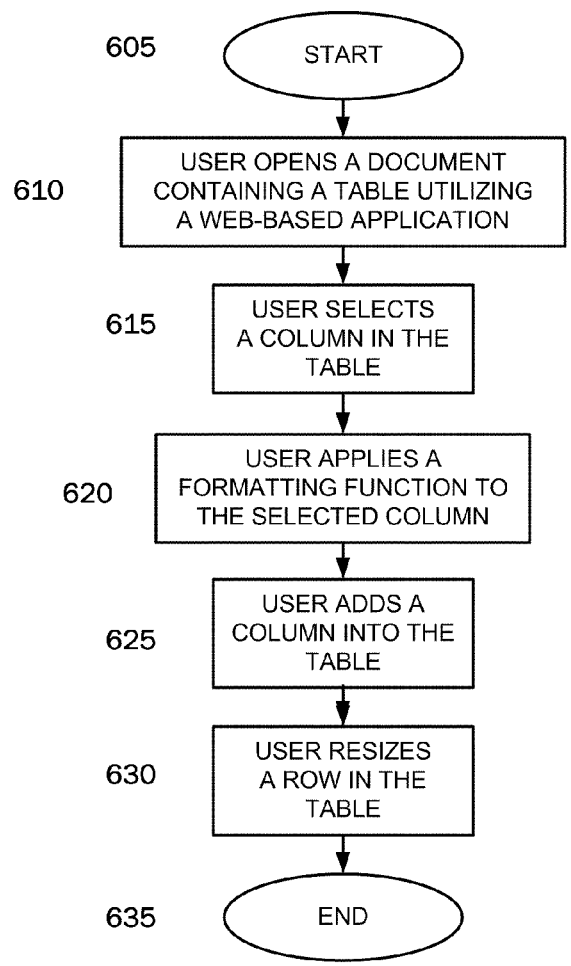
FIG. 6 shows an example of a sample flow for selecting a column or row, adding a row or column into a table, and resizing a row or column of a table utilizing a web-based application.

Having described an example system 100 of an embodiment of a computing architecture in which the present invention may be utilized, FIGS. 2-5 illustrate various selection mechanisms and on-object user interface components encompassed by the present invention. One embodiment of the present invention that may aid in creating a more user-friendly table manipulating experience is a functionality allowing a user to select a row and/or column with a mouse click or via other known input selection mechanisms including, but not limit to, input selection via a trackball, stylus, touchpad, touch-sensitive display device, touch-sensitive display screen, or other type of input device. FIGS. 2 and 3 aid in illustrating a selection feature for activating a selection widget operable to selecting a column or row. According to an embodiment, if a user's cursor is within a specified distance to the left or right of a table, he/she may select an entire row. If a user's cursor is within a specified distance above or below a table, he/she may select an entire column.

Referring to FIG. 2, table 200 contains arrows that are illustrative of the selection directions when a user utilizes a selection widget. According to an embodiment, when a user moves his/her cursor near the perimeter of a table, a selection widget may become active. The specified perimeter over the edges of a table in which a user may place his/her cursor to activate a selection widget may be referred to as selection widget hit zones. If a user's cursor is within a specified perimeter over the edge of the top or bottom of a table, a column selection widget may be displayed. If a user's cursor is within a specified perimeter over the edge of the left or right of a table, a row selection widget may be displayed.

Referring still to FIG. 2, table 225 shows two selection widget hit zones 230 and 240. It should be appreciated that the selection widget hit zones 230 and 240 in table 225 are shown highlighted for illustration purposes only and may not be visible on a computing device display. In one embodiment, if a user places his/her cursor within a column selection widget hit zone 230, an on-object selection user interface (i.e., column selection widget) may be displayed above the corresponding column. In another embodiment, if a user places his/her cursor within a row selection widget hit zone 240, an on-object selection user interface (i.e., row selection widget) may be displayed above the corresponding row. Table 250 in FIG. 2 is an example of what a user interface may look like if a user's cursor 255 hovers within an area or hit zone 230,240 to activate a selection widget. In this example, a user's cursor 255 is hovering within a column selection widget hit zone 230 and also within a row selection widget hit zone 240; and thus, two pieces of on-object selection UI (i.e., row and column selection widgets) 260, 265 are displayed.

According to another embodiment, if a user's cursor 255 is moved over a selection widget 260,265, the appearance of the given selection widget 260,265 may change to indicate that it is active. In one embodiment, an active selection widget 260, 265 may appear darker. As should be appreciated, an indication of activation may be presented in a number of ways including, but not limited to, an active selection widget 260, 265 flashing, enlarged, or in other various ways known in the art.

Referring to FIG. 3, table 300 is an example table illustrating a user's cursor 255 hovering over a column selection widget 260. In this example, a column selection widget 260 appears darkened to indicate that it is active. According to an embodiment, when a user selects a column or row selection widget 260,265 via a mouse click or other known input method, the corresponding column or row may be selected. As should be appreciated, a selected row or column may be indicated in a variety of different ways including, but not limited to, a selected row or column being shaded, highlighted, flashing, displayed in an alternate color, or in other ways known in the art. Table 325 in FIG. 3 is an example table showing a selected column 330 as indicated by a selected column 330 being shaded and also displaying a thickened border.

According to an embodiment, a user may apply a modification to the contents of a selected column 330 or row. For example, a user may want to cut, copy, or apply a formatting attribute such as an underline or bold to the contents of a column or row. A user may select a column or row by methods as described above, and select and perform a modification operation. Accordingly, the modification may be applied to the contents within each of the cells of the selected column or row.

Another feature of the present invention that aids in creating a more user-friendly table manipulating experience is a functionality allowing a user to insert a table object, for example a row or column, into a table via an on-object user interface. FIGS. 4 and 5 help to illustrate this functionality. According to an embodiment, a column selection widget 260,265 may be displayed by methods described above. If a row or column selection widget 260,265 is displayed and a user's cursor 255 is hovered over one of the two endpoints 410, 420, 430, 440 of a selection widget 260,265, the selected endpoint may change in appearance to indicate that it has been activated. As should be appreciated, a selected endpoint 410, 420, 430, 440 may be indicated in a variety of different ways including, but not limited to, a selected endpoint being enlarged, highlighted, flashing, displayed in an alternate color, containing an icon or symbol, in a combination of these, or in other ways known in the art.

Referring to FIG. 4, table 400 is an example of a table in which an endpoint 420 has been activated by a user's cursor 255 being hovered over the said endpoint 420. As shown in table 400, an example selected endpoint 420 is indicated as being selected by being displayed enlarged and displaying a plus sign. According to an embodiment, if a user clicks on or selects a selected endpoint 410,420,430,440 via an input selection method, a column or row is inserted into a table at a given location of the selected endpoint. Referring to FIG. 4, if a user clicks on a selected endpoint 420 of a column selection widget 260, a column 415 may be inserted into a table 425.

Another example is illustrated in FIG. 4 tables 450 and 475. An example user's cursor 255 is hovered over an endpoint 430 of a row selection widget 265. The example selected endpoint 430 may become enlarged and a plus sign may be displayed. A user may click on the enlarged endpoint 430, which then may then add a row 445 at the position of the selected endpoint 430. Alternatively, still referring to FIG. 4 tables 450 and 475, if an example user were to have placed his cursor 255 on and selected endpoint 440, a row would have been inserted between the first row containing the text "Beach", "Hello", and "Description" and the subsequent row containing the text "Event Site" and "Great for overall sailing but gets crowded."

Another feature of the present invention that may aid in creating a more user-friendly table manipulating experience is a functionality allowing a user to easily and fluidly go between manually and automatically resizing a column. FIG. 5 aids in illustrating this functionality. According to one embodiment, a column's width and a row's height may automatically grow to accommodate its content (i.e., auto-fit). According to another embodiment, a column's width and a row's height may be manually adjusted. If a user's cursor 255 hovers over a left or right border of a column, the cursor may change in appearance to indicate that the user may drag and resize the corresponding column(s). According to one embodiment, the cursor 255 may take the form of an on-object user interface and may change in appearance to two vertical lines with a left and right arrow, as illustrated in FIG. 5 table 500. The cursor or on-object user interface may be actuated up or down or right or left for changing a size of a corresponding table object, for example, a column or row. That is, a user may click and drag the border to the left or right to resize the corresponding column(s). According to another embodiment, if a user's cursor 255 hovers over a top or bottom border of a row, the cursor may change in appearance to indicate that the user may drag and resize the corresponding row(s). The cursor 255 may change in appearance to two horizontal lines with an up or down arrow, as illustrated in FIG. 5 table 525. As should be appreciated, the cursor may change in appearance in a variety of ways to indicate that a user may use it to resize a given column or row. A user may click and drag the border up or down to resize the corresponding row.

According to another embodiment, by default, rows and columns of a table may auto-fit. A user may override an auto-fit functionality by manually resizing a row or column via clicking and dragging as described above. A user may return to column and row auto-fit functionality by double-clicking on a row or column border.

The present invention comprises functionalities giving a user the ability to fluidly move back and forth between auto resizing and manual resizing. As should be appreciated, the functionalities and methods of the present invention may be used for table manipulation in applications stored locally on a computing device 110 as well as in remote applications 140 stored on a remote server 130 and accessed via a distributed computing network 120.

Having described embodiments of the present invention with respect to FIGS. 1-5, FIG. 6 is an example logical flow diagram illustrating a method for selecting a column or row, adding a row or column into a table, and resizing a row or column of a table utilizing a web-based application.

The method 600 begins at operation 605 and proceeds to operation 610 where a user opens a document containing a table utilizing a web-based application 140. For example, a user may open a word processing document utilizing a web-based word processing application. As should be appreciated, a variety of remote applications, for example, spreadsheet applications, slide presentation applications, document management applications, and the like may be utilized.

The word processing document may contain a table consisting of two columns and three rows. The user may decide to select one of the columns to modify the contents of the entire column. For example, the user may want to add an underline to text contained in each cell of the column. At operation 615, the user may hover his cursor 255 within the column selection widget hit zone 230, and an on-object selection user interface (i.e., column selection widget 260) may be displayed above the column. The user may then move his cursor 255 over the selection widget 260, which may activate it. The user may then click on the column selection widget 260, which selects the corresponding column.

The user may decide to modify the contents of a column. For example, he/she may want to apply a formatting attribute such as an underline or bold to the contents of a column. The column containing the contents of which the user would like to modify has already been selected in operation 615. At operation 620 the user may select the underline functionality within the user interface and the selected formatting may be applied to the contents within each of the cells of the selected column.

The user may decide to add a column into the table to the right of the already selected column. At operation 625, the user may activate a column selection widget endpoint 420 by hovering his/her cursor 255 over the endpoint of the column selection widget 260. He/she may then select the endpoint 420 via an input method, and accordingly, a column is inserted in the table at the selected endpoint.

The user may decide to resize a row within the table. At operation 630, he/she may move his/her cursor 255 over the row separator line. The cursor 255 may change in appearance to indicate that it is now operable to resize a row. As shown in table 525 in FIG. 5, the cursor may change in appearance to two horizontal lines with an up or down arrow. The user may click and drag his/her cursor up or down to reduce or increase the row height.

The method ends at operation 635. It should be appreciated that the logical flow diagram illustrated in FIG. 6 and described above is merely one example of a method for selecting a column or row, adding a row or column into a table, and resizing a row or column of a table utilizing a web-based application.

Figure 7:
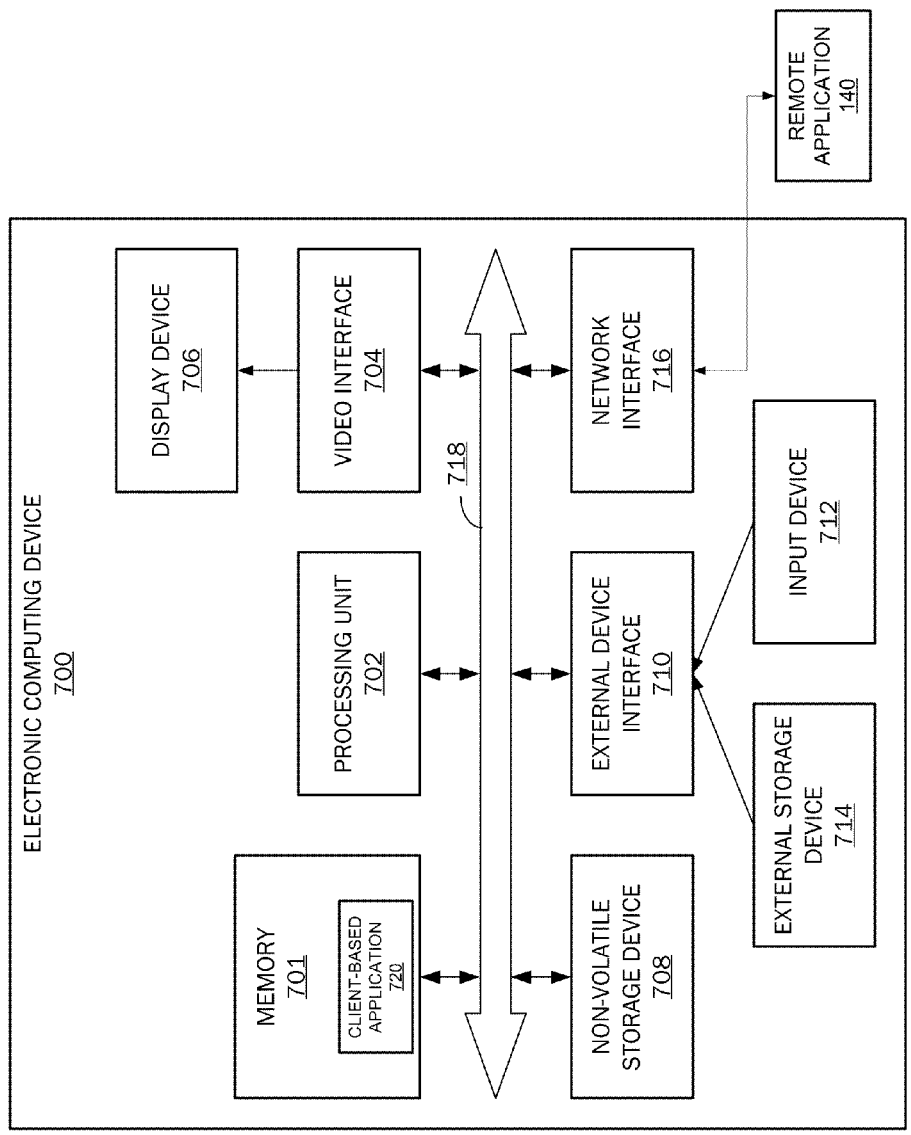
FIG. 7 shows an operating environment for a system that may be used for table manipulation.

FIG. 7 is a block diagram illustrating example physical components on a computing device 700 with which embodiments of the invention may be practiced. Client system 110 and server system 130 and/or electronic computing devices within client system 110 and/or server system 130 may be implemented in the manner of electronic computing device 700. As illustrated in the example of FIG. 7, electronic computing device 700 comprises a memory unit 701. Memory unit 701 is a computer-readable data storage medium that is capable of storing data and instructions. Memory unit 701 may be a variety of different types of computer-readable data storage media including, but not limited to, dynamic random access memory (DRAM), double data rate synchronous dynamic random access memory (DDR SDRAM), reduced latency DRAM, DDR SDRAM, DDR3 SDRAM, Rambus RAM, or other types of computer-readable data storage media. As should be appreciated, client-based applications 720 within which embodiments of the present invention may be utilized may be stored in memory unit 701.

In addition, electronic computing device 700 comprises a processing unit 702. In a first example, processing unit 702 may execute software instructions that cause processing unit 702 to provide specific functionality. In this first example, processing unit 702 may be implemented as one or more processing cores and/or as one or more separate microprocessors. For instance, in this first example, processing unit 702 may be implemented as one or more Intel Core2 microprocessors. Processing unit 702 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 702 may be implemented as an application specific integrated circuit (ASIC) that provides specific functionality. In a third example, processing unit 702 may provide specific functionality by using an ASIC and by executing software instructions.

Electronic computing device 700 also comprises a video interface 704 that enables a client system 110 or a server system 130 to output video information to display device 706. Display device 706 may be a variety of different types of display devices. For instance, display device 706 may be a cathode-ray tube display, an LCD display panel, a plasma screen display panel, a touch-sensitive display panel, a LED array, or another type of display device.

In addition, electronic device 702 includes a non-volatile storage device 708. Non-volatile storage device 708 is a computer-readable data storage medium that is capable of storage data and/or instructions. Non-volatile storage device 708 may be a variety of different types of different non-volatile storage devices. For example, non-volatile storage device 708 may be one or more hard disk drives, magnetic tape drives, CD-ROM drives, DVD-ROM drives, Blu-Ray disc drives, or other types on non-volatile storage devices.

Electronic computing device 700 also includes an external component interface 710 that enables client system 110 and server system 130 to communicate with external components. As illustrated in the example of FIG. 7, external component interface 710 communicates with an input device 712 and an external storage device 714. In one implementation of electronic computing device 700, external component interface 710 is a Universal Serial Bus (USB) interface. In other implementations of electronic computing device 700, electronic computing device 700 may include another type of interface that enables electronic computing device 700 to communicate with input device and/or output devices. For instance, electronic computing device 700 may include a PS/2 interface. Input device 712 may be a variety of different types of devices including, but not limited to, keyboards, mice, trackballs, stylus input devices, touch pads, touch-sensitive display devices, touch-sensitive display screens, or other types of input devices. External storage device 714 may be a variety of different types of computer-readable data storage media including magnetic tape, flash memory modules, magnetic disk drives, optical disc drives, and other computer-readable data storage media.

In addition, electronic computing device 700 includes a network interface 716 that enables electronic computing device 700 to send data to and receive data from network 120. Network interface 716 may be a variety of different types of network interface. For example, network interface 716 may be an Ethernet interface, a token-ring interface, a fiber optic interface, a wireless network interface (e.g. WiFi, WiMax, etc.), or another type of network interface. As should be appreciated, network interface 716 may be operable to accessing and utilizing a remote application 140 stored on a remote server 130.

Electronic computing device 700 also includes a communications medium 718 that facilitates communication among the various components of electronic computing device 700. Communications medium 718 may comprise one or more different types of communication media including, but not limited to, a PCI bus, a PCI Express bus, an accelerated graphics port (AGP) bus, an Infiniband interconnect, a serial Advanced Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 7 (i.e. memory unit 701, non-volatile storage device 708, and external storage device 714). Together, these computer-readable data storage media may constitute a single logical computer-readable data storage medium. This single logical computer-readable data storage medium may store instructions executable by processing unit 702. Actions described in the above description may result from the execution of the instructions stored on this single logical computer-readable data storage medium. Thus, when this description says that a particular logical module performs a particular action, such a statement may be interpreted to mean that instructions of the software module cause a processing unit, such as processing unit 702, to perform the action.

As described herein, an improved method is provided for table manipulation. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

I claim:

1. A method for selecting a row or column within a computer-generated table at a client computing device, the method comprising:

providing a row perimeter zone for each row within a table, the row perimeter zone being located at a border of the row at the perimeter of the table, providing a column perimeter zone for each column within the table, the column perimeter zone being located at the border of the column at the perimeter of the table;

receiving an indication of a cursor being located within a specified perimeter zone, the specified perimeter zone being the row perimeter zone for one of the rows or being the column perimeter zone for one of the columns within the table;

in response to receiving an indication of a cursor being located within a specified perimeter zone, displaying an on-object user interface, the on-object user interface being located at the border of the column associated with the specified perimeter zone or at the border of the row associated within the perimeter zone;

receiving an indication of a selection of the displayed on-object user interface;

in response to receiving an indication of a selection of the displayed on-object user interface, designating the row or column within the table associated with the displayed on-object user interface for allowing modification to content contained within the designated row or column;

after displaying an on-object user interface and in response to receiving an indication of a cursor being located on the displayed on-object user interface, activating the displayed on-object user interface; and in response to activating the displayed on-object user interface, providing an indication that the on-object user interface is activated for designating the row or column within the table associated with the displayed on-object user interface for allowing modification to content contained within the designated row or column, wherein activation includes changing a visual appearance of the activated on-object user interface.

2. The method of claim 1, wherein receiving an indication of a cursor being located within a specified perimeter zone associated with a row or column within a table includes receiving an indication that the cursor is located within a specified area immediately above or below a given column for associating the displayed on-object user interface with the given column.

3. The method of claim 1, wherein receiving an indication of a cursor being located within a specified perimeter zone associated with a row or column within a table includes receiving an indication that the cursor is located within a specified area immediately to the right or to the left of a given row for associating the displayed on-object user interface with the given row.

4. The method of claim 1, wherein receiving an indication of a cursor being located within a specified perimeter zone associated with a row or column within a table includes receiving an indication of a cursor being located within a specified perimeter zone associated with a row or column within a web-based table.

5. The method of claim 1, wherein receiving an indication of a cursor being located within a specified perimeter zone associated with a row or column within a table includes receiving an indication of a cursor being located within a specified perimeter zone associated with a row or column within a client-based table.

6. The method of claim 1, wherein receiving an indication of a cursor being located within a specified perimeter zone associated with a row or columns within a table includes receiving an indication that the cursor is located within a specified area immediately above or below a given column for associating the displayed on-object user interface with the given column, and wherein an endpoint of the displayed on-object user interface is positioned at a location in the table at which a new column is inserted.

7. The method of claim 1, wherein receiving an indication of a cursor being located within a specified perimeter zone associated with a row or column within a table includes receiving an indication that the cursor is located within a specified area immediately to the right or to the left of a given row for associating the displayed on-object user interface with the given row and wherein an endpoint of the displayed on-object user interface is positioned at a location in the table at which the new row is inserted.

8. The method of claim 1, wherein receiving an indication of a cursor being located within a specified perimeter zone associated with a row or column within a table includes receiving an indication of a cursor being located within a specified perimeter zone associated with a row or column within a client-based table.

9. A method for inserting a row or column within a computer-generated table at a client computing device, the method comprising:

displaying a web-interface including a table in a browser on the client computing device;

providing a row perimeter zone for each row within a table, the row perimeter zone being located at a border of the row at the perimeter of the table, providing a column perimeter zone for each column within the table, the column perimeter zone being located at the border of the column at the perimeter of the table;

receiving an indication of a cursor being located within a specified perimeter zone, the specified perimeter zone being the row perimeter zone for one of the rows or being the column perimeter zone for one of the columns within the table on the web-interface;

in response to receiving an indication of a cursor being located within a specified perimeter zone, displaying an on-object user interface located at the border of the column associated with the specified perimeter zone or at the border of the row associated within the perimeter zone;

receiving an indication of a selection of an endpoint of the displayed on-object user interface; and in response to receiving an indication of a selection of an endpoint of the displayed on-object user interface, inserting a table object within the table at the specified location of the selected endpoint of the displayed on-object user interface, wherein when selection of the endpoint is within a specified area immediately right or left of a given column, inserting a new column within the table at the specified location of the selected endpoint of the displayed on-object user interface; and when the cursor is located within a specified area immediately above or below a given row, inserting a new row within the table at the specified location of the selected endpoint of the displayed on-object user interface.

10. The method of claim 9, wherein after displaying an on-object user interface and in response to a cursor being located on an endpoint of a displayed on-object user interface, activating the endpoint of the displayed on-object user interface; and in response to activating the endpoint of the displayed on-object user interface, providing an indication that the activated endpoint of the displayed on-object user interface is activated, for allowing inserting a table object within the table at the specified location of the selected endpoint of the displayed on-object user interface.

11. The method of claim 10, wherein providing an indication that the activated endpoint of the displayed on-object user interface is activated, for allowing inserting a table object within the table at the specified location of the selected endpoint of the displayed on-object user interface includes changing a visual appearance of the activated on-object user interface.

12. The method of claim 10, wherein receiving an indication of a cursor being located within a specified perimeter zone associated with a row or column within a table includes receiving an indication that the cursor is located within a specified area immediately above or below a given column for associating the displayed on-object user interface with the given column, and wherein the endpoint of the displayed on-object user interface is positioned at a location in the table at which the new column is inserted.

13. The method of claim 10, wherein receiving an indication of a cursor being located within a specified perimeter zone associated with a row or column within a table includes receiving an indication that the cursor is located within a specified area immediately to the right or to the left of a given row for associating the displayed on-object user interface with the given row and wherein the endpoint of the displayed on-object user interface is positioned at a location in the table at which the new row is inserted.

14. The method of claim 10, wherein receiving an indication of a cursor being located within a specified perimeter zone associated with a row or column within a table includes receiving an indication that the cursor is located within a specified area immediately to the right or to the left of a given row for associating the displayed on-object user interface with the given row.

15. The method of claim 10, wherein the indication that the activated endpoint of the displayed on-object user interface is activated includes changing a visual appearance of the activated on-object user interface.

16. The method of claim 9, wherein receiving an indication of a cursor being located within a specified perimeter zone associated with a row or column within a table includes receiving an indication of a cursor being located within a specified perimeter zone associated with a row or column within a web-based table.

17. The method of claim 9, wherein receiving an indication of a cursor being located within a specified perimeter zone associated with a row or column within a table includes receiving an indication of a cursor being located within a specified perimeter zone associated with a row or column within a client-based table.

* * * * *